United States Patent [19]
Greitzer et al.

[11] Patent Number: 5,372,194
[45] Date of Patent: * Dec. 13, 1994

[54] METHOD OF AND MEANS FOR OPERATING GEOTHERMAL WELLS

[75] Inventors: Yeshayahu Greitzer, Ramat Hasharon; Lucien Y. Bronicki, Yavne, both of Israel

[73] Assignee: Ormat Turbines (1965) Ltd., Yavne, Israel

[*] Notice: The portion of the term of this patent subsequent to Oct. 8, 2008 has been disclaimed.

[21] Appl. No.: 58,790

[22] Filed: May 10, 1993

Related U.S. Application Data

[63] Continuation of Ser. No. 716,106, Jun. 17, 1991, abandoned, which is a continuation-in-part of Ser. No. 524,433, May 17, 1990, Pat. No. 5,054,556.

[51] Int. Cl.$^5$ .............................................. E21B 43/27
[52] U.S. Cl. ...................................... 166/302; 166/57; 166/307; 166/902
[58] Field of Search ............ 166/57, 270, 271, 300, 166/302, 307, 902; 60/641.2, 641.3, 641.4, 641.5

[56] References Cited

U.S. PATENT DOCUMENTS

| | | | |
|---|---|---|---|
| 2,137,167 | 11/1938 | Lang | 166/307 X |
| 2,237,131 | 4/1941 | Carr | 166/307 |
| 3,463,232 | 8/1969 | Scofield | 166/307 |
| 3,807,500 | 4/1974 | Thigpen, Jr. et al. | 166/303 |
| 3,927,717 | 12/1975 | Tate | 166/271 |
| 3,968,840 | 7/1976 | Tate | 166/280 |
| 4,454,917 | 6/1984 | Poston | 166/307 X |
| 4,479,543 | 10/1984 | Kalfayan et al. | 166/300 |
| 4,500,434 | 2/1985 | Jost et al. | 166/310 X |
| 4,625,803 | 12/1986 | Walhaug et al. | 166/307 X |
| 4,632,601 | 12/1986 | Kuwada | 166/305.1 X |
| 4,871,024 | 10/1989 | Cizek | 166/307 |
| 5,054,556 | 10/1991 | Greitzer et al. | 166/57 X |

FOREIGN PATENT DOCUMENTS 3019533 11/1981 Germany.

OTHER PUBLICATIONS

Watkins, M. et al, "Corrosion Testing of Highly Alloyed Materials for Deep, Sour Gas Well Environments", *Journal of Petroleum Technology*, Jun. 1976, pp. 698–704.

*Primary Examiner*—George A. Suchfield
*Attorney, Agent, or Firm*—Sandler, Greenblum & Bernstein

[57] ABSTRACT

A geothermal well is operated by continuously pumping spent geothermal fluid into the well and continuously adding concentrated acid to the spent geothermal fluid, such that the concentration of acid in the fluid is in the range of 0.1% to 5%, and occasionally to 10%. Over a period of time, the spend geothermal fluid flowing through the geological formations of the geothermal field carries the dilute acid into the formations for dissolving rock and increasing the permeability thereof. If it is desired to decrease the permeability of the formations, components of drilling mud or other suitable material, are continuously added to the spent geothermal fluid.

32 Claims, 2 Drawing Sheets

METHOD OF AND MEANS FOR OPERATING GEOTHERMAL WELLS

RELATED APPLICATION

This application is a continuation of application Ser. No. 07/716,106, filed Jun. 17, 1991, now abandoned, which is a continuation-in-part of application Ser. No. 07/524,433, filed May 17, 1990, which issued as U.S. Pat. No. 5,054,556 on Oct. 8, 1991.

TECHNICAL FIELD

This invention relates to a method of and means for operating a geothermal well, and more particularly, for increasing its flow rate.

BACKGROUND ART

As a geothermal field ages by reason of long term extraction of hot geothermal fluid from geological formations in the field, and long term reinjection of spent heat depleted geothermal fluid into the field, two results often occur: 1) a reduction in the mass flow rate and temperature of hot geothermal fluid from production wells in the field; and 2) an increase in the pressure required to reinject spent geothermal fluid into injection wells in the field. Both problems apparently result from reductions in the permeability of the geological formations in the field.

Another common problem that often occurs in an operating geothermal field is coupling between an injection well and a production well whereby the heat depleted geothermal fluid pumped into the injection well begins to adversely affect the temperature of the hot geothermal fluid extracted from a nearby production well. The exact mechanism that controls these results is not entirely understood at this time, but it is presently believed that the problems are related to the permeability, or changes in the permeability, of the geological formations in which the wells are located. Such changes apparently are caused by long-term extraction of hot geothermal fluid from, and long-term injection of spent geothermal fluid into, the geological formations of a field.

In order to increase the rate at which spent geothermal fluid can be disposed of in an injection well, it is conventional to carry out what is termed "acidizing" the well. Such approach is also used for increasing the flow rate of geothermal fluid from a production well. This is a procedure by which concentrated acid is applied to a stratum whose location and nature is determined from geological studies for the purpose of increasing the permeability of the stratum by the dissolving action of the acid on the rock in the stratum. The procedure, which is time consuming, costly, and dangerous, requires the injection well to be taken out of operation.

The first step after operation is terminated is to place rubber seals in the well at the upper and lower limits of the stratum to be treated. These placements require the use of a rig having drilling pipes for inserting and withdrawing the rubber seals; and usually, a considerable investment in time and labor is involved. Next, a pipe is run down the well from the surface to the upper seal for gaining access to the region of the well between the rubber seals. An acid solution of 10–20% concentration is then pumped through the pipe into the volume between the seals for a period of from 1 to a few hours. Both water and acid must be trucked to the well-head for this purpose; and a considerable volume of liquid is required for this operation. The acid solution percolates through the stratum defined by the seals and dissolves some of the rock therein increasing the permeability of the stratum. Finally, the rubber seals are removed by the rig, and operation can be resumed.

This is a batch approach to increasing the permeability of a stratum. It is expensive because the well being treated must be taken out of operation, and and testing of the efficacy of the treatment can be done only by closing the well and resuming operations. This results in a tendency to over-treat a well which further increases the cost in money and time.

Concerning the problem of leakage between an injection well and a production well, no practical solution is presently available. All of these problems are beginning to seriously affect existing geothermal fields which still contain a significant amount of energy whose extraction is highly desirable.

It is therefore an object of the present invention to provide a new and improved method of and means for operating geothermal wells to selectively modify the permeability of geological formations in which both injection and production wells are located.

BRIEF DESCRIPTION OF THE INVENTION

According to the present invention, carrier fluid, such as spent geothermal fluid, is continuously applied to a geothermal well, using a pump, for example, and sufficient concentrated acid is continuously added to the carrier fluid such that the concentration of acid in the carrier fluid is in the range 0.1% to 10%, but preferably, that concentration is not greater than 5%. Normally, this operation will occur over a period of time measured in days or weeks, rather than hours as in the case of the prior art, and is thus a continuous rather than a batch process. The carrier fluid can be available water, or geothermal fluid which is used in this specification to mean mostly geothermal liquid. Even so, the geothermal fluid should be taken to include steam, wherein the steam may be present with liquid, or steam alone. Preferably, some quantities of substances such as inhibitors suitable for reducing corrosive effects of the acid solution on the well casing or liner may be added to the carrier fluid. Usually, the pH will be increased by the additives.

In accordance with the invention, the natural flow of the carrier fluid through the various strata of the geological formation in which the well is located, will carry the dilute acid to those portions of the formation susceptible to being dissolved. The integrated effect of the exposure of the rock in the formation to dilute acid over a relatively long period of time is to slowly increase the permeability of the various strata throughout the entire field in which the carrier fluid flows. This continuous process, which is distinguished from the batch process of the prior art, does not require suspension of operation of an injection well, and ensures the application of an acid solution to whatever strata the flow of spent fluid passes, thereby applying the dilute acid to the various strata. When treatment of an injection well is involved, the long term effect of this approach is to increase the permeability of various strata thereby decreasing the resistance of the injection well to the flow of spent geothermal fluid in the normal use of the well.

The acid solution may be added to the carrier fluid before the latter enters the injection well. Preferably, however, the acid solution is added to the carrier fluid at a predetermined depth in the well consistent with the location of the slotted liner in the well through which geothermal fluid would flow into the surrounding rock formations. This latter operation is carried out by inserting a conduit into the injection well such that the lower end of the conduit is located below the upper unslotted metallic casing of the well. This has the advantage of protecting the upper casing from being corroded by the dilute acid. A solution of concentrated acid is then pumped into the upper end of the conduit so that the solution exits the lower end below the casing and is carried by the spent geothermal fluid into the geothermal formations in which the well is located. Preferably, the conduit is constructed from corrosion resistant metal, e.g., titanium, etc.

The present invention also involves a method for increasing flow from a production well. In such case, the flow of hot geothermal fluid from the production well is terminated, and carrier fluid, such as spent geothermal fluid, can be diverted from a nearby injection well and forced into the production well. Acid solution is added to the carrier fluid in the manner described above, preferably by piping the dilute acid to a level below the unperforated casing. Over a period of several days or weeks, the dilute acid will increase the permeability of the rock formations penetrated by the carrier fluid carrying the dilute acid. At the end of the treatment period, production of the well may be resumed with an increased rate of flow.

The present invention also involves a method for reducing leakage between an injection well that receives spent geothermal fluid, and a production well that produces high temperature geothermal fluid. According to the present invention, a conduit is inserted into the injection well to a depth consistent with the stratum in which leakage is believed to occur between the injection well and the production well. Components of drilling mud, or other material suitable for reducing the permeability of the stratum can be pumped into the conduit for effecting a flow of the mud or other material into the stratum reducing its permeability and suppressing further leakage. Alternatively, drilling mud components, or other suitable material, can be added to the carrier fluid before it enters the well. In such case, the mud or other material flows with the carrier fluid as the latter flows along its usual paths into the stratum surrounding the well locally reducing its permeability, thus reducing the underground fluid flow velocity, and suppressing further leakage. Furthermore, such methods can be used to merely reduce permeability of certain formation strata surrounding the well.

In addition, the present invention also involves a method for developing a new geothermal injection or production well once drilling is completed. According to the present invention, carrier fluid, preferably spent geothermal fluid, from a nearby injection well is diverted to the drilled well and forced into the well. Acid solution is added, in the manner described above, to the carrier fluid for the purpose of increasing the permeability of rock formations surrounding the well. At the end of the treatment period, operation of the well as an injection or production well, as the case may be, can be commenced.

The present invention is applicable to geological formations containing minerals and structure susceptible to reaction with acids. Thus, limestone and similar rock, including dolomite rock, and dolomite limestone, or other types of rock including magmatic, volcanic, and sedimentary rock, calcite, and similar minerals, in veins or other formations in rocks, are all likely candidates for the application of the present invention. Furthermore, the invention is applicable to open hole wells (i.e., wells without liners) in addition to wells with liners.

Where the geological rock formations include layers containing fissured hard limestone, stone calcium carbonate, and dolomite, hydrochloric acid is particularly well suited for use in the present invention.

BRIEF DESCRIPTION OF THE DRAWINGS

Embodiments of the present invention are described below by way of example and with reference to the accompanying drawings wherein.

DETAILED DESCRIPTION

Figure 1:
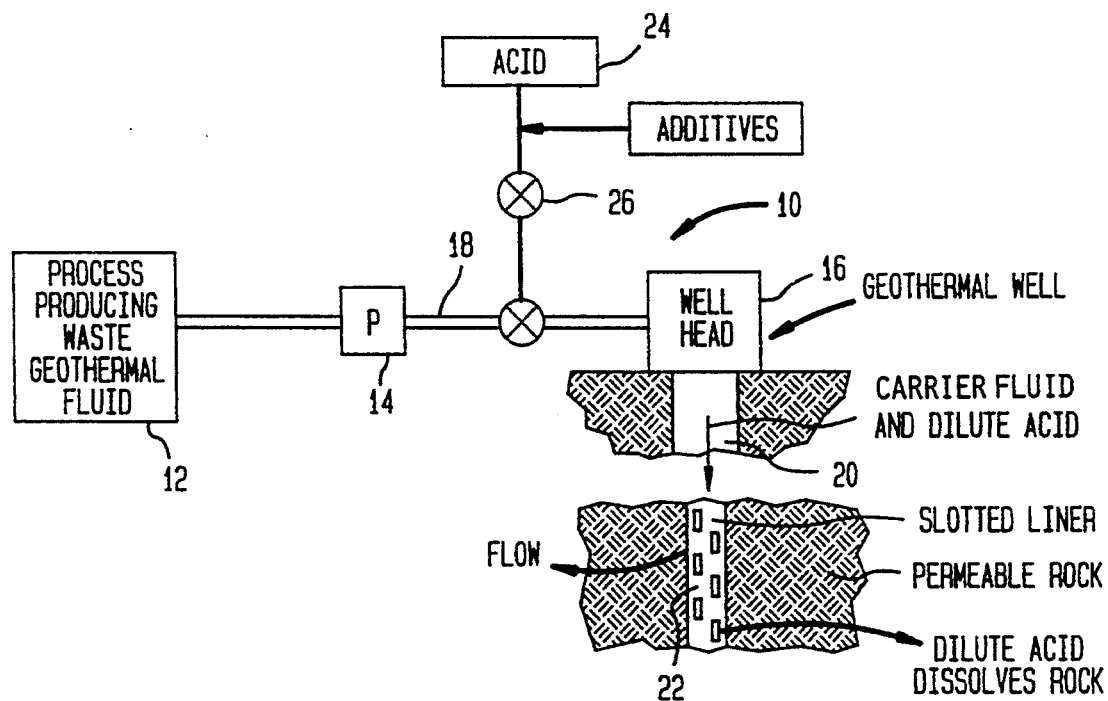
FIG. 1 is a schematic block diagram showing one aspect of the present invention wherein acid solution is continuously added to a carrier fluid being injected into a well in a geothermal field.

Referring now to FIG. 1 of the drawings, reference numeral 10 designates apparatus according to the present invention for adding concentrated acid to a carrier fluid, such as spent geothermal fluid, that is pumped into a rejection well. That is to say, source 12 represents the equipment that operates on hot geothermal fluid, extracts heat therefrom, and produces spent, or heat depleted geothermal fluid that must be disposed of. Pump 14 may be provided for pressurizes the spent fluid before the latter is delivered to well-head 16 via pipe 18. Such fluid is applied to injection well 20, and the pressure is sufficient to force the fluid down the well and through the openings in slotted liner 22 that constitutes the lower portion of the well. The fluid that exits the well enters into and flows through permeable rock in the geological formation in which the well is located until the pressure is dissipated.

As the well ages, the permeability of the rock formations apparently decrease, perhaps due to the precipitation of the mineral rich fluid which is cooled by contact with the rock formations. Furthermore, it could well be that the permeability of the rock formations surrounding the well was initially insufficient. In any event, experience has shown that injection pressure must be increased with time to maintain the same mass flow of fluid. The first approach to ameliorating this problem is shown in FIG. 1 wherein concentrated acid, preferably hydrochloric acid, in source 24 is metered at 26 into the flow of fluid in pipe 18 such that the concentration of acid in the fluid is in the range 0.1% to 10%. Preferably, the concentration does not exceed about 5%. Small quantities of additives, such as inhibitors present in container 25, are fed into the spent geothermal fluid to reduce corrosive action of the acid solution on the well casing or lining by controlling the pH of the diluted acid.

As a consequence, the spent geothermal fluid carrying the dilute acid flows through slotted liner 22 along its usual paths into the rock formation surrounding the well. Wherever dissolvable rock is encountered in these paths, the dilute acid reacts with the rock increasing its permeability.

The treatment continues over a period of time measured in days and weeks as the dilute acid slowly but effectively continues to dissolve rock in the flow path of the fluid. The effect on the surrounding rock formations is the integration over a long period of time of dilute acid acting on the rock; and eventually, the permeability of the rock will be sufficiently increased to result in a reduction in the pressure needed in order to dispose of the spent geothermal fluid.

The actual amount of time will, of course, depend on the nature of the geological formation in which the well is located; but it is presently contemplated that a time period in excess of 24 hours will be required, and probably of the order of magnitude of a week. In this sense, therefore, the present invention involves a continuous treatment of the entire well without interrupting its operation, as distinguished from the conventional treatment which is a batch process that involves shutting down the well and acidizing only a preselected stratum for only a few hours.

Figure 2:
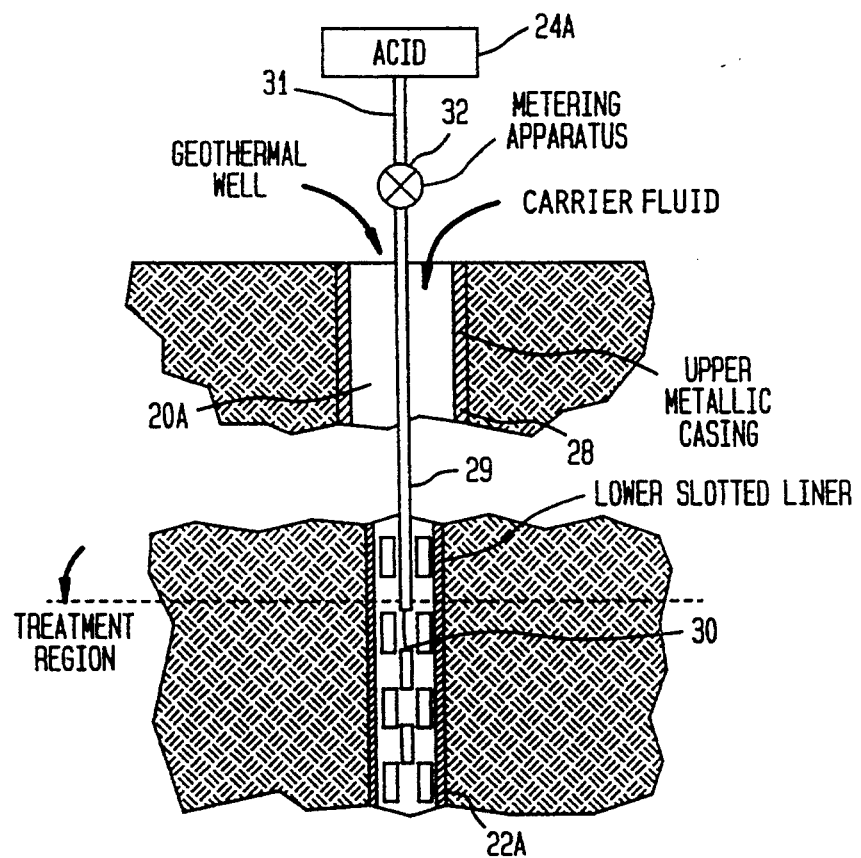
FIG. 2 is a schematic block diagram showing another embodiment of the present invention for treating an injection well or a production well with dilute acid in a continuous process.

Because the dilute acid in the spent geothermal fluid may have a corrosive effect on the well head equipment and the upper casing of the well above the lower slotted liner 22A, the arrangement shown in FIG. 2 is preferred, particularly when the concentration of acid in the fluid exceeds about 1%. As shown in FIG. 2, well 20A is treated, according to the present invention, by metering concentrated acid into the spent geothermal fluid at a location below casing structure 28 of the well. To effect this operation, conduit 29, constructed preferably from corrosion resistant material, e.g., titanium, etc., is inserted into the well to a depth consistent with the location at which acid treatment is to begin. This depth is determined by an analysis of geological information associated with the well which is beyond the scope of this specification, suffice it to say that conduit 29 is inserted into the well, preferably such that its lower end 30 is located at the desired depth, and its upper end 31 terminates in a connection to source 24A.

Metering pump 32 pumps concentrated acid from source 24A to lower end 30 of the conduit into the well at a rate such that the concentration of acid in the spent geothermal fluid at the outlet of the conduit no greater than about 10%, but preferably no greater than about 5%. The treatment region will be that portion of the geological field affected by the flow of fluid from the well below the end 30 of the conduit.

Figure 3:
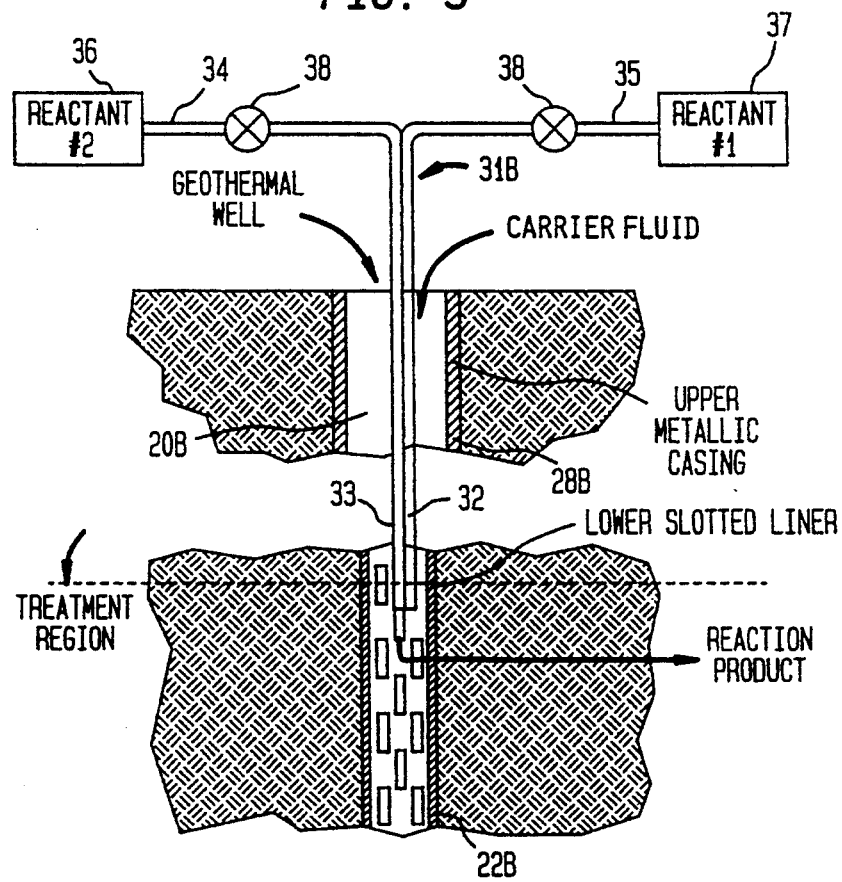
FIG. 3 is a further embodiment of the present invention.

A further embodiment of the invention is shown in FIG. 3 wherein two reactants are injected into the geothermal fluid, the reactants producing a reaction product when they mix. In a manner analogous to the operation of the embodiments described above, the flow of geothermal fluid into the geological formation surrounding the well serves to carry the product into the rock formations for changing the permeability of thereof. Depending upon the nature of the product, the permeability may be increased or decreased.

Specifically, geothermal fluid is pumped down well 20B in the usual manner; but, as shown in FIG. 3, conduit 31B extends from the surface of the well to a level below casing 28B in the vicinity of the upper portion of slotted liner 22B. Conduit 31B comprises a pair of pipes 32, 33 whose top ends 34, 35 are connected respectively to different reactant sources 36, 37. The reactants in the sources are of the type that react to form a reaction product when mixed.

In operation, conduit 31B is inserted into the well, and metering pumps 38 inject the two reactants into the well at the level determined by the lower end of the conduit. The two reactants mix together when they exit from pipes 32, 33 producing a product that is carried by the flowing geothermal fluid into the surrounding rock formation. As before, the time period over which the product is produced is measured in days and weeks, depending on the nature of the product.

Figure 4:
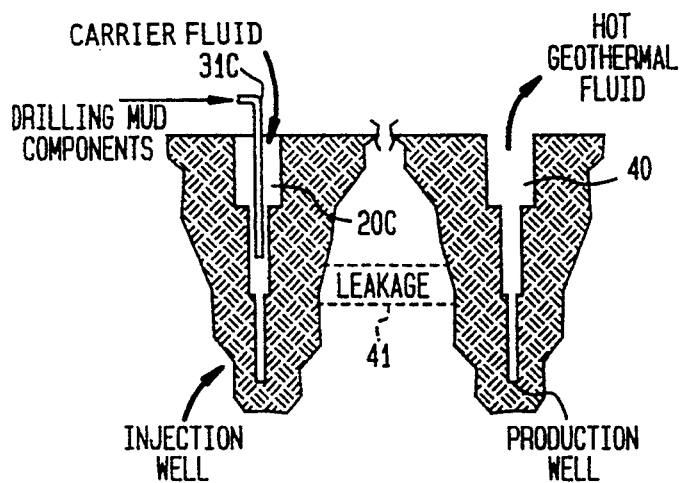
FIG. 4 is a still further embodiment of the present invention for reducing leakage between an injection well and a production well.
Figure 4A:
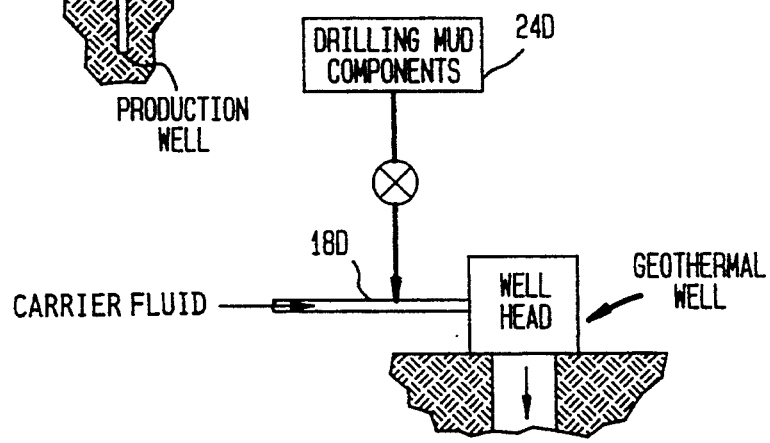
FIG. 4A is another embodiment of the present invention for reducing leakage between an injection well and a production well.

Furthermore, the present invention also contemplates injecting components of drilling mud or other suitable materials into an operating injection well for the purpose of decoupling the well from a production well. This approach is illustrated in FIG. 4 where conduit 31C is located in injection well 20C which is in the vicinity of production well 40 from which hot geothermal fluid is withdrawn. The lower end of the conduit is located at a level consistent with a leakage path 41 that connects well 20C to well 40. Components of drilling mud, produced at the surface of the injection well, are pumped into the injection well through conduit 31C and flow though the slotted liner into the rock formation following the path of least resistance which is the leakage coupling to the production well. The result is that the drilling mud components, or other material decrease the local permeability of the rock formations through which they percolate, reducing underground fluid flow velocity and achieving decoupling the injection well from the production well. If preferred, decoupling of an injection well from a production well also can be achieved using an arrangement similar to that illustrated in FIG. 1. As shown in FIG. 4A, components of drilling mud, or other suitable materials, present in container 24D can be added to spent geothermal fluid flowing in pipe 18D prior to the entry of the fluid into the injection well. Furthermore, such method can be used merely to reduce permeability of certain formation strata surrounding the well.

Additionally, the present invention also can be used for developing new geothermal injection or production wells once drilling is completed. Methods shown in FIGS. 1-3 can be used for adding acid solutions, or other suitable chemicals, to spent geothermal fluid diverted from an injection well and forced into the newly drilled well. The fluid carrying the dilute acid will flow into rock formations surrounding the well, and the dilute acid will react with the formations increasing their permeability. Subsequently, at the end of the treatment period, operation of the well as an injection or production well, as the case may be, can be commenced.

At present, it is envisaged that the present invention will be carried out to change the permeability of rock formations at depths ranging from 100-2000 m. However, in actual fact, the invention can be used for changing the permeability of rock formations at any depth.

In general, the present invention can be used to treat wells using fluid other than spent geothermal fluid. For example, brackish surface water, or water available form a source other than a geothermal well, can be used. In addition, where the well being treated has a metallic liner, inhibitors can be added to the fluid to reduce the deleterious effect that acids have on metallic liners.

Care should be taken when applying the present invention to an open hole that the hole does not collapse and that the cement surrounding the casing of the well is not destroyed. Especially, care should be taken not to use the present invention in certain sandy formations particularly where an open hole well is present because application of the present invention to a well of this type could cause it to collapse.

Unsuitable use, and too long an application of the present to a well without suitable continuous inspection of the technical state of the well may bring about its unintended destruction, and in an extreme case may cause blowout of the well.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for treating a geothermal well located in a geological rock formation, said method comprising the steps of:
   a) supplying a carrier liquid to the well for effecting dissipation of the carrier liquid in the geological rock formation;
   b) adding liquid acid to the carrier liquid at a predetermined depth in the well such that the concentration of acid in the carrier liquid is sufficient to increase the permeability of said geological rock formation; and
   c) continuing steps a) and b) until the desired degree of permeability is achieved.

2. A method for treating a geothermal well located in a geological rock formation, said method comprising the steps of:
   a) supplying a carrier fluid to the well for effecting dissipation of the carrier fluid in the geological rock formation;
   b) adding an acid to the carrier fluid at a predetermined depth in the well such that the concentration of acid in the fluid is sufficient to increase the permeability of said geological rock formation; and
   c) continuing steps a) and b) until the desired degree of permeability is achieved; and
   d) wherein the well is an injection well.

3. A method according to claim 2, wherein the acid solution is added to the fluid before the latter enters the well.

4. A method according to claim 2 wherein the concentration of acid in the carrier fluid is in the range 0.1% to 10%.

5. A method according to claim 2 wherein the acid is hydrochloric acid.

6. A method according to claim 2 wherein the geological rock formation includes rock selected from the group consisting of limestone rock, dolomite rock, magmamatic rock, volcanic rock, and sedimentary rock.

7. A method according to claim 2 including the step of inserting a liner into the well before the fluid is applied thereto.

8. A method according to claim 2 wherein said fluid is spent geothermal fluid.

9. A method according to claim 2 wherein the concentration of acid in the fluid is not greater than about 5%.

10. A method according to claim 2 wherein the fluid is applied to the well using a pump.

11. A method for treating a geothermal well located in a geological rock formation, said method comprising the steps of:
    a) supplying a carrier fluid to the well for effecting dissipation of the carrier fluid in the geological rock formation;
    b) adding an acid to the carrier fluid at a predetermined depth in the well such that the concentration of acid in the fluid is sufficient to increase the permeability of said geological rock formation; and
    c) continuing steps a) and b) until the desired degree of permeability is achieved; and
    d) wherein the well is a production well.

12. A method according to claim 11, wherein the acid solution is added to the fluid before the latter enters the well.

13. A method according to claim 11 wherein the concentration of acid in the carrier fluid is in the range 0.1% to 10%.

14. A method according to claim 11 wherein the acid is hydrochloric acid.

15. A method according to claim 11 wherein the geological rock formation includes rock selected from the group consisting of limestone rock, dolomite rock, magmamatic rock, volcanic rock, and sedimentary rock.

16. A method according to claim 11 including the step of inserting a liner into the well before the fluid is applied thereto.

17. A method according to claim 11 wherein said fluid is spent geothermal fluid.

18. A method according to claim 11 wherein the concentration of acid in the fluid is not greater than about 5%.

19. A method according to claim 11 wherein the fluid is applied to the well using a pump.

20. A method for operating a well having an upper casing and a lower slotted liner and located in a field having various geological formations, said method comprising the steps of:
    a) applying geothermal fluid to said well;
    b) inserting a conduit into the well such that the lower end of the conduit is located below said upper casing;
    c) pumping an acid solution into the top of the conduit so that the solution exits the lower end of the conduit below said casing, and is carried by the fluid into said geological formations, the acid solution having a concentration sufficient to increase the permeability of the geological formations into which the acid solution is carried; and
    d) continuing step c) until the permeability of the geological formation has increased to the desired degree.

21. A method according to claim 20 wherein the concentration of acid in the fluid is in the range 0.1% to 10%.

22. A method according to claim 12 wherein the concentration of acid in the fluid is not greater than about 5%.

23. A method according to claim 20 wherein the the fluid is applied to the well using a pump.

24. (Amended) In combination:

a) a well located in geological rock formations containing constituents that react with acids;
b) a source of geothermal fluid;
c) means for applying said fluid to said well; and
d) means for adding acid to said fluid such that the concentration of acid in the fluid is in the range 0.1% to 10%;
e) wherein said means for adding is constructed and arranged so that the acid is added to the fluid only at a predetermined depth in the well.

25. Apparatus according to claim 24 wherein said means for adding includes a conduit in said well extending from the surface to said predetermined depth, said conduit having a top end at the surface of the well into which said acid is added, and a bottom open end at which said predetermined depth for effecting entry of said acid into said fluid.

26. Apparatus according to claim 24 wherein said means for applying said fluid to the well is a pump.

27. A method for developing a new well in a geological rock formation containing constituents that react with acids, said method comprising the steps of:
a) drilling a new well in the rock formation;
b) inserting a conduit into the new well so that the lower open end is at a predetermined depth;
c) applying fluid to the new well through said conduit so that said fluid is dissipated in said formation; and
d) adding concentrated acid to the fluid in an amount sufficient to achieve an acid concentration in the range 0.1% to 10%.

28. A method according to claim 27 wherein the concentration of acid in the fluid in not greater than about 5%.

29. A method according to claim 28 wherein said conduit is made from corrosion resistant metal.

30. A method according to claim 29 wherein said conduit is made form titanium.

31. A method according to claim 27 wherein the geological rock formation includes rock selected from the group consisting of limestone rock, dolomite rock, magmamatic rock, volcanic rock, and sedimentary rock.

32. A method according to claim 27 including the step of inserting a liner into the well before the fluid is applied thereto.

* * * * *